Patented May 18, 1948

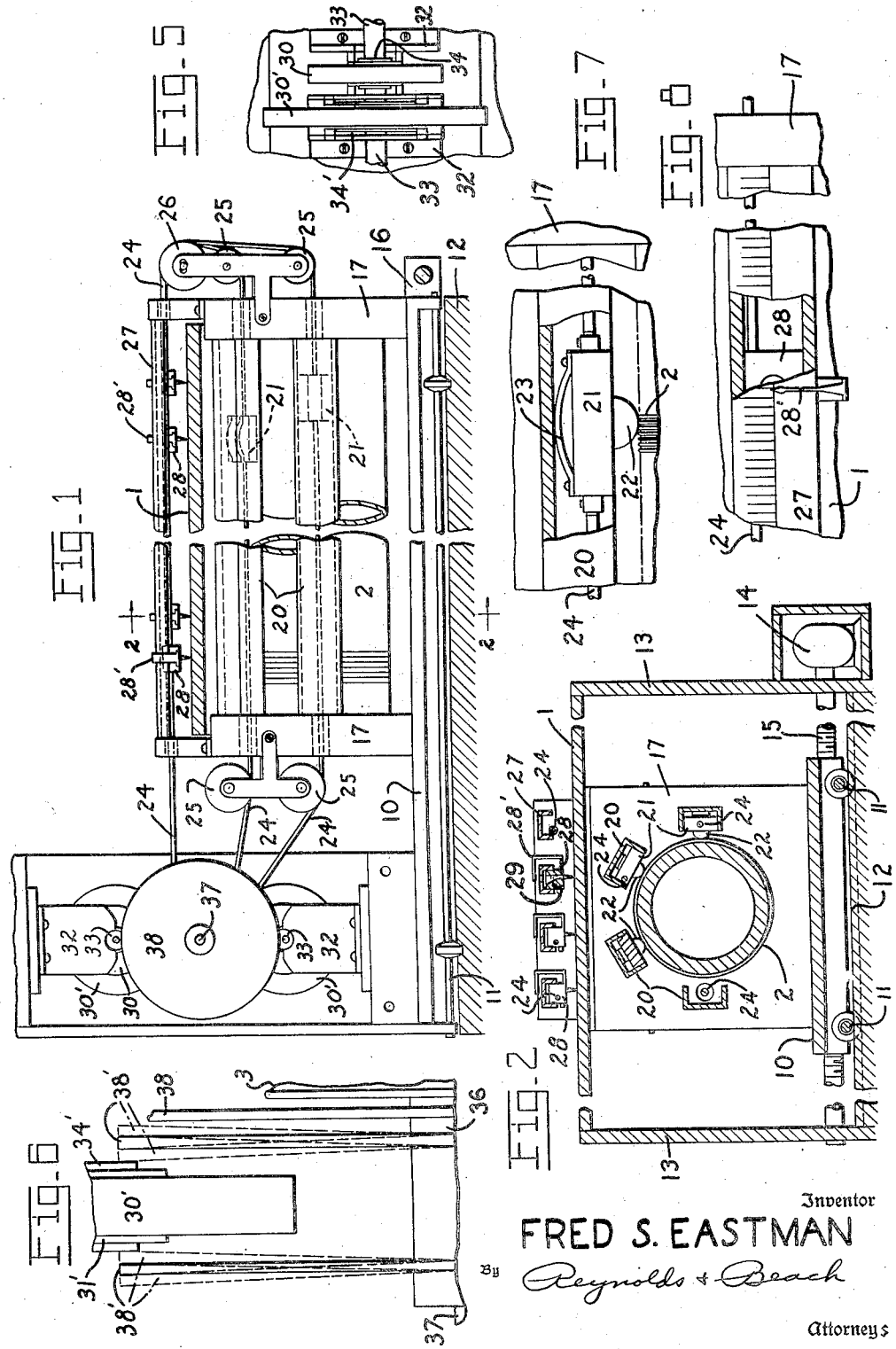

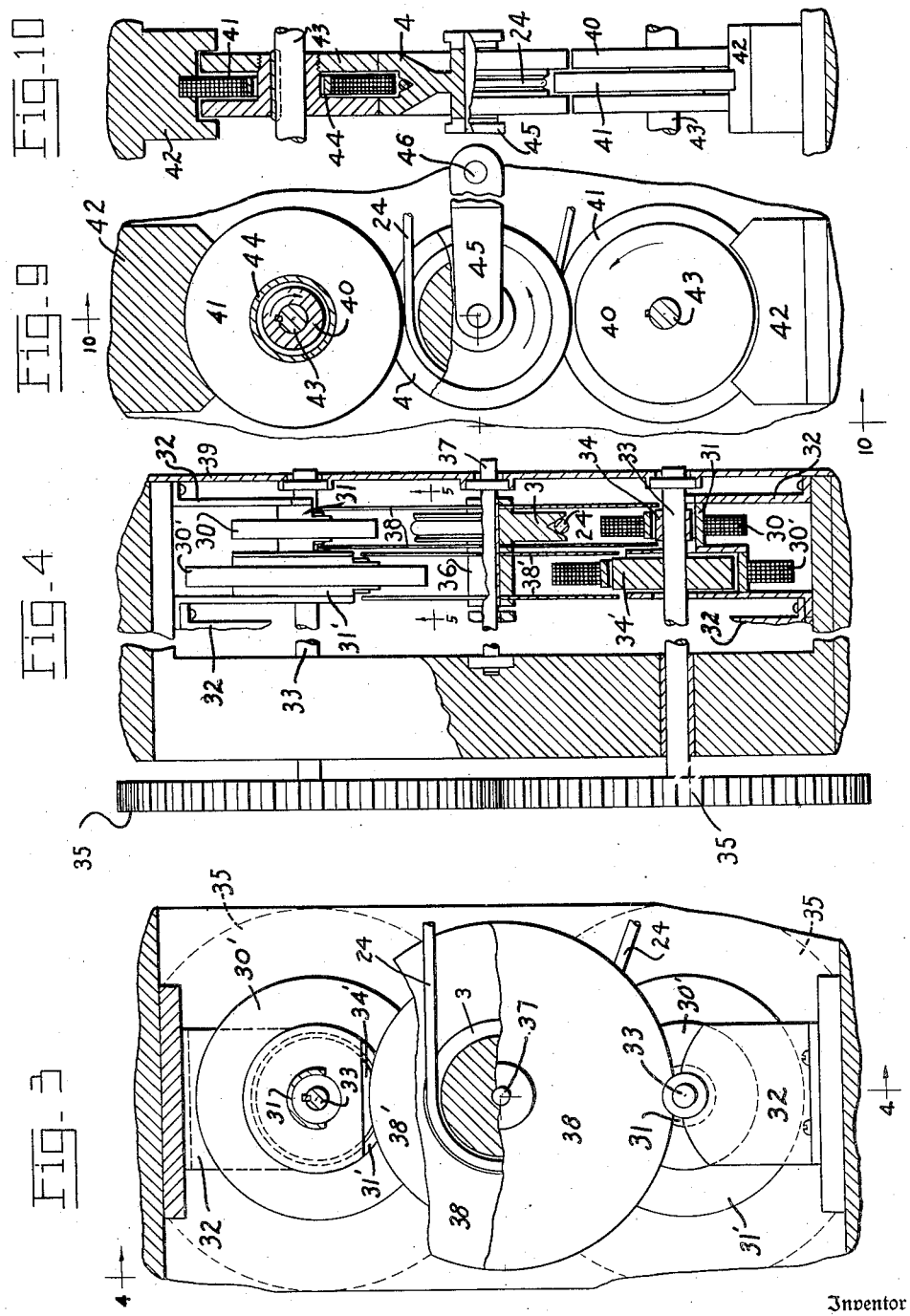

2,441,693

UNITED STATES PATENT OFFICE 2,441,693

DRIVE MECHANISM

Fred S. Eastman, Seattle, Wash.

Application January 20, 1942, Serial No. 427,460

13 Claims. (Cl. 74—210)

My invention relates to drive mechanisms especially useful for measuring instruments, and particularly for the type which records measurements by means of a stylus moved automatically to draw a graph or to register a value according to some variable quantity being measured. Specifically it constitutes an automatic control and driving arrangement which may be used to move a stylus in response to a change in value of such quantity. While my mechanism may be used with various types of devices, I have illustrated it as arranged to drive a slide-wire potentiometer slider. An example of another use is for moving a weight along a scale balance beam.

In potentiometers, automatic scales, and like instruments, sliders have heretofore been reciprocated by a feed screw drive, the operation of which is necessarily slow in registering changes, especially if of large value. Moreover the great inertia of the moving parts makes it difficult for the slider, in being shifted to a new location, to be stopped quickly and accurately in its proper position. As applied to a slide-wire potentiometer, for example if the current governing the position of the slider changes drastically there is a considerable lag between such current change and the relocation of the slide along the slide-wire, by rotation of the feed screw, to a position corresponding exactly with such new current. Before a condition of equilibrium, with the slider at rest, is reached under these conditions, the current may have changed again, so that, in fact, a slider driven by a feed screw may not be able to follow accurately even moderately rapid and pronounced current changes, and in any event the lag of the slider movement over the current change which induces such movement is appreciable.

The drive arrangement that I have devised has parts which are small and light to minimize inertia effect, and the drive mechanism for the slider can move it rapidly along its path of reciprocation so that no appreciable delay occurs in establishing a different position along the potentiometer in response to a current change. Control mechanism for the drive can be operated instantaneously in response to a variation in current, to initiate readjustment in the position of the driven member, and further, may be capable of driving at different speeds, as well as in either direction. Thus the driven member may be moved quickly to approximately its correct new location, and then the speed may be reduced to establish the precise position, which action reduces oscillation or hunting of such member.

The slide-wire potentiometer, described in conjunction with a typical application of my mechanism, has an arrangement for both indicating and plotting current variations in a slider circuit, or the corresponding variable factor. Several sliders, each for a different variable, may be accommodated. Each slider, instead of being driven by a feed screw, in my device is attached directly to a reciprocating drive member, such as a pull wire. An indicating pointer or a recording stylus, or both, will be moved by the pull wire in synchronism with translation of the slider along the coil. The pull wire may loop around a drive pulley rotated by mechanism which may be both reversible and variable in speed. In order to operate instantaneously, a clutch controlling rotation of the drive pulley may be magnetically actuated. While such magnetic clutch arrangement may take various forms, I prefer that fixed magnetizing electric coils be used, and that the drive pulley itself, or parts rotatable with it, function as an armature for a power rotated wheel magnetized by such a fixed coil when an electric current flows through it.

A typical arrangement of my magnetically operated clutch includes two wheels continuously rotated, one in one direction and the other reversely, located on opposite sides of the pull wire drive pulley. Encircling each wheel is a fixed magnetizing coil which is axially narrower than the wheel extending through it and spaced radially outward from it to provide clearance. When one of these coils is energized, flux is set up in its wheel which attracts the pull wire drive pulley into tractive engagement with it, so that the pulley is rotated by the continuously rotating wheel thus magnetized. Such engagement between the wheel and pulley may be either peripheral or lateral, although the latter is preferred because it may be arranged more easily to effect variations in speed.

In the lateral contact type of magnetic clutch, pinch plates secured to the pull wire drive pulley may pinch the margin of one or another of a plurality of continuously rotated wheels, when attracted by magnetizing such wheel, the plates functioning as an armature. Different wheels may be of different radius, be rotated at different speeds, or turn in different directions. A peripheral contact arrangement might include a pair of wheels disposed on opposite sides of the pull wire pulley and continuously rotating about stationary axes located so that the peripheries of such wheels are spaced apart a distance slightly greater than the diameter of the pulley. The pulley is mounted on an axle shiftable laterally at will to bring its periphery into contact with that of either of the rotating wheels. Such wheels, also, may be of different size, rotated at different speeds, or turn in opposite directions, according to the type of control over the pulley desired.

Various other modifications and arrangements of my drive and magnetic clutch mechanism, employing the principles disclosed herein, may be designed for particular uses all within the scope of my invention. The drawings illustrate practical embodiments of my drive and control clutch arrangements for a slide-wire potentiometer having multiple sliders.

Figure 1 is a side elevational view of the potentiometer and drive mechanism, and Figure 2 is a transverse section through the potentiometer structure taken on line 2—2 of Figure 1.

Figure 3 is a side elevational view of one form of electro-magnetic clutch employed in my drive arrangement, showing parts broken away, and Figure 4 is an elevational view, with parts in section, taken along line 4—4 of Figure 3. Figure 5 is a fragmentary bottom plan view of a part of my device on line 5—5 of Figure 4. Figure 6 is an enlarged detail view of a portion of the clutch mechanism shown in Figures 3 and 4.

Figure 7 is an elevational view of a portion of the potentiometer structure, parts being broken away to show the slider.

Figure 8 is a fragmentary plan view of part of the indicating and recording mechanism showing parts broken away.

Figure 9 is a side elevational view of an alternative form of magnetic clutch arrangement for my drive mechanism with parts broken away. Figure 10 is an elevational view, with parts in section, taken along line 10—10 of Figure 9.

When my slider drive and recording mechanism is used in conjunction with a slide-wire potentiometer, the various parts may be arranged in the manner shown generally in Figures 1 and 2. The assembly there portrayed will record automatically graphs of four variable factors, and preferably the respective values are plotted with reference to one coordinate, while a common variable is represented by the other coordinate of the several graphs. Thus each variable factor may be plotted against time, for example, as a constantly changing factor. Such an arrangement is particularly well suited for plotting forces or moments created on an airfoil in a wind tunnel by air flowing through it as the angle of attack of the airfoil is varied at a constant rate. The common variable in such instance might be angle of attack, whereas the sliders would move in response to different airfoil stresses or air flow conditions, and each of these would be plotted correspondingly by a separate stylus. Such factors might, for example, be lift, drag and pitching moment of the airfoil, and air speed. A fewer or greater number of sliders and recording pens could be employed as the utility of the particular installation might require.

Suitable electrical mechanism will be provided so that the current through each slider circuit, and hence the equilibrium position of the slider along the potentiometer coil, will vary in proportion to a change in the variable factor to be measured, assuming that the current through the slide-wire coil as a whole is constant. The electromagnetic clutch actuating mechanism will be operated in response to a change in such factor so that the slider will be moved along the slide-wire a distance proportional to such change. The slider drive mechanism will again be deenergized when a condition of equilibrium has been reached between the potentiometer circuit and the slider drive circuit under the new conditions. The particular electric control system for effecting this action is not part of my present invention, nor is the arrangement of the several sliders relative to the potentiometer or of the styluses relative to the recording surface, and reference need be made to such features only in so far as they provide some medium for energizing and utilizing the drive mechanism disclosed herein in a particularly useful and representative application of such mechanism.

Upon a table 1 paper is mounted, constituting a graph plotting surface, and continuous and uniform movement of a stylus relative to this surface along one coordinate will be effected, while movement of the stylus along the other coordinate will be responsive to a change in the factor which it plots. Such constant movement may be accomplished by mounting the slide-wire and stylus drive mechanism on a carriage 10, supported on axles 11 having wheels which roll at a constant speed along a base 12 beneath the graph table 1. This table is supported by upright brackets 13 projecting above the base 12 beyond the travel zone of carriage 10. The carriage is traversed beneath the plotting table in timed relation to the uniformly variable factor by a motor 14 geared to rotate a feed screw 15, which is journalled in the supporting brackets 13 and threaded through a nut 16 on the carriage. Operation of motor 14 may be synchronized with the change in the angle of attack of an airfoil in wind tunnel work, for example, and the drive described will move the carriage lengthwise of table 1 in synchronism with such change.

Between end plates 17 mounted upon the carriage is supported the slide-wire or potentiometer coil 2 extending transversely of tale 1. Guide channels 20 spaced circumferentially about coil 2 and alongside it also extend transversely of the table between end supports 17. Each of these channels guides a slider 21 for reciprocation lengthwise of the coil with its button 22 pressed into electrical contact with coil 2 by a spring 23 reacting from the bottom of the channel guide.

The slider 21 is moved along the coil by a drive member reciprocable with it, which may be rigid to afford both a pushing and a pulling action, but which preferably is a flexible tension member arranged to pull the slider in either direction. A pull wire 24 may have its ends attached one to each end of the slider and make a continuous loop, or the wire may be divided into two parts, one at each end of the slider, that connected to one end of the slider being reciprocated by the positive drive mechanism of the instant invention, and the wire part connected to the other end of the slider being spring tensioned to hold the wire part between the drive mechanism and slider taut at all times. In the return or loop type of pull wire illustrated, the intermediate portion of the wire passes across the top of table 1. The pull wire is maintained in the channel guiding movement of the slider by guide pulleys 25 aligned with the channel and journalled in suitable brackets mounted on the end supports 17. Beyond guide pulley 25 at one end of the potentiometer coil the pull wire 24 passes around a drive pulley 3, while beyond the guide pulley 25 at the opposite end of the potentiometer coil the pull wire passes up over a tightener pulley 26 which may be moved to tension the wire.

The drive pulley 3 and tensioning pulley 26 guide the pull wire through another guide channel 27 above the table 1 within which slides a stylus block 28. This block may have an ink reservoir to feed a pen resting upon the graph paper mounted on table 1, or a stylus of any other suitable kind, and in addition preferably has a pointer 28' extending around the guide channel 27 to cooperate with a scale on its upper side, graduated like the corresponding coordinate of the graph plotting paper. Preferably pull wire 24 extends through an aperture in the block and is secured to it in proper position by a set screw 29, as shown in Figure 2. The setting of the stylus may thus easily be coordinated with the slider by tightening the set screw onto the pull wire when the stylus block pointer coincides with the index mark on the scale corresponding to the value of the variable factor for which the slider is positioned.

With the slider 21 and stylus block 28 thus interconnected by the pull wire 24, the stylus will mark each movement of the slider along the potentiometer coil. As stated above, the slider will move in response to a change in the factor being measured by proper operation of the clutch controlling rotation of the pull wire drive pulley 3. Each stylus, therefore, will be moved in accordance with variations in the measured factor.

My preferred clutch mechanism is shown in detail in Figures 3, 4, and 5. As stated previously, it is of the electromagnetic type, the drive control means including a fixed coil 30 mounted upon a collar 31 and held by a suitable supporting bracket 32. Through the fixed collar 31 extends a shaft 33 upon which is pressed a wheel 34 to rotate with the shaft. This wheel is wider than the axial extent of the coil so that it projects beyond the coil on both sides, but is of less diameter than the internal diameter of the collar, to leave a space between them. Shaft 33 is continuously power rotated by a drive gear 35, which may mesh with a similar gear driving in the reverse direction another shaft 33 on the opposite side of pulley 3. Thus wheels 34, on opposite sides of the pulley, will be turned one in one direction and the other oppositely.

The pull wire pulley 3 is carried by a hub 36, journalled upon a fixed shaft 37. Also on this hub is carried a pair of discs or plates 38, one on each side of pulley 3, which have a radial extent sufficient to enable their peripheries to lie alongside both continuously rotating wheels 34. The plates 38 straddle coils 30 and are spaced apart sufficiently so that when they are precisely perpendicular to shaft 37 they will not contact the lateral faces of wheels 34. These plates, however, are either sufficiently flexible, or are mounted to tilt through a large enough angle with respect to hub 36, that the peripheries of the plates may pinch wheels 34 one at a time, thus to effect a tractive engagement between these members. Such action is shown best in Figure 6. The solid line positions of the discs indicate, in somewhat exaggerated fashion, their spacing from the side faces of the wheels when perpendicular to hub 36. These plates may be deflected to the inner broken line positions by the attraction of a wheel 34 when magnetized by energization of coil 30, in which position they pinch the margin of the wheel. When the opposite wheel 34 is magnetized to attract the plates and tilt them oppositely into pinching engagement with such wheel, they will assume the outer broken line positions with respect to the wheel shown.

As long as the coils 30 remain deenergized, the plates 38 will be perpendicular to shaft 37 and will remain out of pinching contact with all coplanar wheels 34. If a coil 30 is energized in response to a variation in current through its corresponding slider circuit, the wheel 34 within it will be magnetized. Plates 34 lying alongside the wheel thus magnetized, in conjunction with interconnecting hub 36, will constitute an armature for such magnetized wheel, and will be attracted into pinching engagement with its margin to effect rotation of the discs, and pull wire drive pulley 3 rotating with them, in the direction opposite that in which such wheel turns. Pulley 3 thus rotated will in turn reciprocate the pull wire 24 engaged with it and the associated slider. As soon as the current through coil 30 is discontinued, the plates 38 will immediately be released to stop driving the slider. Suitable braking mechanism may, if desired, be provided for hub 36 in order to arrest the slider instantaneously upon deenergization of the magnetizing coil.

Such drive mechanism may include only a single power rotated wheel to be gripped by pinch plates 38. By provision of a second coplanar wheel 34 rotating in the opposite direction, and engaged by a separate clutch, as suggested above, slider 21 may be reciprocated in either direction. Further wheels and clutches may be utilized to drive the slider at different speeds as well as to reverse it. As shown in Figure 4, for example, only marginal contact is afforded between a wheel 34 and plates 38, and the relative speeds of shafts 33 and 37 are inversely proportional to the effective diameters of the wheel and pinch plates. Thus shaft 33 will rotate at a comparatively high speed to drive hub 36 much more slowly. If it is desired to rotate pulley 3 at different speeds, for example to move the slider at high speed until it has reached approximately its correct position along the potentiometer coil, and then to reduce its speed for finally positioning it, the use of such additional wheels is preferable to regulating the speed of a single wheel.

Continuously rotatable wheels of different diameters, or otherwise arranged to rotate at different circumferential speeds, may be spaced circumferentially but arranged coplanar, their rotative axes being parallel to hub 36 and spaced from it a distance such that edge portions of plates 38 just overlap a marginal portion of each such wheel. In fact three or four, and possibly five or six, different wheels could all be disposed between the same pair of pinch plates for selective engagement by them. In each instance, of course, the wheel will be encircled by a fixed magnetizing coil, separately energizable to magnetize only one wheel at a time. The requirements for any number of such wheels and coils to be arranged to cooperate with a single pair of pinch plates 38 are that the peripheries of all wheels be located approximately equidistant from the axis of the pull wire pulley, and that there be sufficient room between proper coils for passage of pull wire 24.

Instead of locating wheels to provide different speeds between a single pair of pinch plates, a second continuously rotated wheel 34' may be mounted on each shaft 33, as shown in Figures 3 and 4. A second pair of pinch plates 38' secured upon hub 36 will be of a radius such that their outer edges just overlap a marginal portion of each wheel 38'. In order to drive pulley 3 at a higher speed than would be effected by interengagement of plates 38 with a wheel 34, plates 38' will be of smaller diameter than plates 38, and wheel 34' will be of larger diameter than wheel 34.

Upon energization of a coil 30' encircling wheel 34', constituting the control means for this drive, therefore, the speed at which pulley 3 is rotated will be greater despite rotation of shaft 33 at the same speed as before. To move the slider 21 to its approximate location the coil 30' appropriate for effecting its reciprocation in the proper direction will be energized, and when the slider approaches its correct new position this coil will be deenergized and the adjacent coil 30 will be energized to rotate pulley 3 at a slower rate until the slider reaches exactly its proper place, whereupon coil 30 also will be deenergized.

The construction and operation of the mechanism for driving only one pulley 3 has been described, but it will be understood that a corresponding drive for each of the several sliders shown in Figures 1 and 2 will be provided. With a construction like that of Figures 3 and 4 aligned wheels 34 and 34' of all the pull wire pulley drives may be secured upon the same shaft 33. If two such shafts are employed, rotated in opposite directions by gears 35, all sliders may be reciprocated in either direction independently, either separately or conjointly. These gears, of course, will be driven continuously by any suitable power mechanism. A plate 39 to cover the face of the assembly, as shown in Figure 4, may serve also as a support for the outer ends of shafts 33 and 37 in the manner illustrated.

It will be understood that my clutch mechanism, providing a single-speed, unidirectional drive, or a reversible drive, or a variable speed drive, may be actuated to move the pull-wire 24 by any suitable circuit closing arrangement. As illustrated, the mechanism is intended to be operated automatically by electrical controls in response to a factor to be measured, but a slider or a recording stylus or other element moved by pull-wire 24 might be actuated by an operator. Thus manual switches could be closed selectively to energize the proper clutch coil in response to a change in some phenomenon observed by the operator. Other applications of my device will occur to those familiar with this art.

Moreover, the construction of the clutch element may be modified according to the requirements of a particular installation. Thus the pinch plates, instead of rotating with pulley 3, might be mounted on shaft 33 to rotate with it. When a coil 30 is energized wheel 34 will be magnetized as before, and in addition the pinch plates 38 will be magnetized, and will be attracted into pinching, tractive engagement with drive means, such as the periphery of pulley 3. In this instance the pulley functions as the armature between the magnetized pinch plates instead of the latter themselves being the armature. If, as suggested above, a rigid reciprocable drive bar should be used in place of the flexible pull-wire 24, the pinch plates thus mounted might even pinch such a drive member directly, without a pulley or rotative drive member being used. The arrangement and structure of the clutch therefore will depend upon the nature of the particular drive means for the slider, stylus, or other driven element, and such drive means may be either rotated or reciprocated by my clutch in one of the various forms which it may assume.

While the drive arrangement for the slider pull wires described is the one which I prefer, other constructions accomplishing similar results may be employed. Such an alternative arrangement is shown in Figures 9 and 10, for example. As in the other form of my device illustrated, continuously rotated wheels 40 are located one on each side of the pull wire drive pulley 4, and preferably these wheels are of the same diameter and rotate in opposite directions to afford a reversing drive for the pulley and slider.

The clutch mechanism to effect a driving engagement between a wheel 40 and pulley 4 is controlled by a fixed magnetizing coil 41 encircling a reduced central portion of the wheel which is of H-shaped diametral section, as shown in Figure 10, the coil being narrow enough for reception with ample clearance on both sides between the wide side flanges of the wheel. The coil is suitably supported in a mounting base 42 and located so that it is concentric with the wheel 40 and its shaft 43. Clearance in a radial direction will, of course, be provided between the ring 44 on which the coil is mounted and the wheel. One of the wheel's side flanges is removable for assembling the coil and ring over its hub.

In this type of construction, peripheral driving contact between a continuously rotated wheel 40 and the pull wire drive pulley is utilized. The coil 41 may be of large enough diameter to project radially beyond the flanges of wheel 40 a distance sufficient for embedment in base 42 in the manner shown. In such case the periphery of pulley 4 must have a channel of sufficient width and depth to receive the projecting part of coil 41 when the pulley is in contact with the associated wheel 40, and the slider pull wire 24 will be received in a V-shaped groove in the base of such channel. Another type of mounting for coil 41 may be used, however, in which a band encircles the periphery of the coil and holds it in a saddle block replacing base 42. With such construction the coil need not be of greater diameter than the wheel flanges, so that the annular channel in pulley 4, such as shown in Figures 9 and 10, is rendered unnecessary.

Shafts 43 are definitely spaced apart so that driving contact with pulley 4 is afforded by its bodily lateral movement to move its periphery into contact with one or the other of the wheels 40, depending on the direction in which reciprocation of the pull wire is desired. To enable the pulley to be thus moved, it is journalled upon a yoke 45 which swings about a pivot 46. While it might be possible to distribute around pulley 4 additional continuously rotating wheels 40 to drive the pulley at different speeds, contact between the pulley and one of such additional wheels would be difficult because of the necessary universal mounting of pulley 4. With such a construction some automatic tensioning arrangement would be required for pull wire 24. For this reason, where a variable speed drive for the slider is desired, the previously described form utilizing lateral pinch plates is preferable.

A modified form of this type of clutch might employ a cylindrical wheel 40, instead of one of H-shaped diametral section as shown in Figure 10. In order to contact such a wheel peripherally in the manner shown in Figure 10, pulley 4 in such instance must be made of H-shaped diametral section to accommodate coil 41 between its side flanges, so that such flanges may engage the cylindrical power-driven wheel. With this arrangement coil 41 could be removed without disturbing wheel 40 if pulley 4 were provided with a removable flange, as indicated for pulley 40 in Figure 10, or if the pulley were first withdrawn edgewise from alongside the coil, such as by moving yoke 45 lengthwise.

What I claim as my invention is:

1. Drive mechanism, comprising a drive pulley, a pair of axially spaced discs rotatable with said drive pulley, a power driven wheel continuously rotatable about an axis parallel to the axis of rotation of said pulley, the spacing between the rotative axis of said pulley and the periphery of said wheel being slightly less than the radius of said discs and the width of said wheel being slightly less than the spacing between the central portions of said discs, to dispose portions of their peripheries alongside part of the wheel's margin, an electric coil received between said discs and encircling said wheel, spaced radially outward from the encircled portion of said wheel, and energizable to magnetize said wheel for attracting the edges of said discs into lateral pinching, tractive engagement with such marginal portion of said wheel, to drive said pulley from said wheel, and means supporting said coil stationarily independently of said wheel.

2. In combination with the drive mechanism of claim 1, a second wheel rotatable conjointly with the first wheel, and of a diameter different from the first wheel, a second pair of discs rotatable with the pulley and spaced apart a distance slightly in excess of the width of said second wheel, the radius of said second pair of discs being slightly greater than the spacing between the periphery of said second wheel and the pulley axis, to dispose portions of the peripheries of said second discs alongside a marginal portion of said second wheel, a second electric coil encircling said second wheel, and energizable independently of the first coil to magnetize said second wheel for attracting the edges of said second discs into lateral pinching, tractive engagement with such marginal portion of said second wheel, to drive the pulley from said second wheel, and means supporting said second coil stationarily independently of said second wheel, selective energization of said coils effecting rotation of the pull wire pulley by the first wheel through the first pair of discs at one speed, or by said second wheel through said second pair of discs at a different speed.

3. Drive mechanism, comprising a drive pulley, a plurality of continuously rotatable, power driven wheels disposed substantially coplanar with said drive pulley, all said wheels having their peripheries spaced substantially the same distance from the axis of said drive pulley, a pair of discs disposed concentrically with said drive pulley and rotatable therewith, said discs being of a radius slightly greater than the distance between the pulley axis and the periphery of each continuously rotatable wheel, and each wheel being of a width slightly less than the spacing between the central portions of said discs, to dispose portions of their peripheries alongside a marginal portion of each wheel, but normally out of tractive engagement therewith, a plurality of electric coils, each encircling one of said wheels and disposed between said discs, said coils being selectively energizable to magnetize only one of said wheels at a time for attracting the edges of said discs into lateral pinching, tractive engagement such marginal portion of such one wheel, to drive said pulley from that wheel.

4. Drive mechanism comprising a driven wheel, a plurality of continuously power rotated wheels, means supporting said driven wheel for movement into and out of peripheral engagement with each of said power rotated wheels, and a plurality of electric coils corresponding respectively to said power rotated wheels, energizable selectively to magnetize their respective power rotated wheels for attracting said driven wheel to move it into peripheral tractive engagement with only one such power rotated wheel at a time.

5. Drive mechanism comprising a driven wheel, a plurality of continuously power rotated wheels, means supporting said driven wheel for movement into and out of peripheral engagement with each of said power rotated wheels, a plurality of electric coils corresponding respectively to said power rotated wheels, each coil being disposed substantially concentrically with its respective power rotated wheel, and said coils being energizable selectively to magnetize their respective power rotated wheels for attracting said driven wheel to move it into peripheral tractive engagement with only one such power rotated wheel at a time, and means supporting said coils stationarily independently of said wheels.

6. Controllable drive mechanism, comprising a drive pulley, two wheels rotated continuously in opposite directions and disposed substantially coplanar with said drive pulley, means supporting said drive pulley floating between said wheels, and an electric coil disposed substantially concentric with each continuously rotated wheel, one of said coils being energizable to magnetize its wheel for drawing said drive pulley into contact with such wheel and effecting driving engagement between them to rotate said pulley in one direction, and the other coil being energizable, while said first coil is deenergized, to magnetize its wheel for drawing said drive pulley away from the wheel of said first coil and into contact with the wheel of said second coil and effecting driving engagement between them to rotate said pulley in the reverse direction.

7. Drive mechanism comprising a drive member, a driven member adjacent to said drive member, a pair of pressure elements disposed at opposite sides of said drive and driven members, means interconnecting said pressure elements for conjoint movement in the same direction and connecting said pressure elements to one of said members for movement therewith, and magnetizable means operable to effect approach movement of said pressure elements to pinch the other of said members therebetween for transmitting movement of said drive member to said driven member.

8. Drive mechanism comprising a drive member, a driven member adjacent to said drive member, a pair of magnetizable plates disposed alongside one of said members and movable therewith, and having edge portions of said plates overlapping the other of said members, and means operable to establish a magnetic flux through a path including said plates to effect approach movement of such overlapping edge portions of said plates to pinch the member therebetween for transmitting movement of said drive member to said driven member.

9. Controllable drive mechanism comprising a driving member, a driven member adjacent to said driving member, and means operable to establish a driving connection between said driving member and said driven member including a pair of magnetizable plates disposed alongside opposite face portions of said driving and driven members, and magnetizing means operable to establish magnetic flux through a path including said plates, thereby to effect approach movement of edge portions of said plates to pinch one of said members therebetween for transmitting movement of said drive member to said driven member.

10. Controllable drive mechanism comprising a continuously rotatable power driven wheel, a pair of plates lying alongside opposite faces of said power rotated wheel, and means for magnetizing said wheel, thereby to move portions of said plates relatively toward each other to effect balanced pinching tractive engagement of said plates with said continuously rotatable wheel for effective movement of said plates by rotation of said wheel.

11. Driving mechanism comprising a driven wheel, a continuously power rotated wheel disposed adjacent to and substantially coplanar with said driven wheel, a pair of plates lying along opposite faces of and rotatable with one of said wheels, and of larger diameter than such wheel to form edge portions thereof projecting beyond the periphery of such wheel and overlapping the other wheel, and means operable to tilt said plates to effect approach movement of such overlapping edge portions of said plates to pinch the wheel therebetween for rotating said driven wheel by rotation of said power rotated wheel.

12. Drive mechanism comprising two rotative members rotatable about parallel axes, one of said rotative members including a magnetizable pressure element having a portion thereof disposed alongside the other of said rotative members and engageable with the marginal portion thereof, and means operable to establish magnetic flux through a path including the portion of said magnetizable pressure element alongside such other rotatable member to exert a pressure between such other member and the portion of said pressure element alongside it in a direction generally parallel to the rotative axes of said rotatable members sufficient to transmit movement between said rotatable members.

13. Drive mechanism comprising two continuously power rotated wheels rotatable on parallel axes, a driven wheel disposed intermediate said power rotated wheels and rotatable about an axis parallel to the rotative axis of said power rotated wheels, and a plurality of magnetic means correspondingly respectively to said power rotated wheels, selectively energizable, and operable when energized to establish driving engagement at any given time between the margin of only a selected one of said power rotated wheels, corresponding to the energized magnetic means, and the margin of said driven wheel.

FRED S. EASTMAN.

REFERENCES CITED

The following references are of record in the file of this patent:

UNITED STATES PATENTS

| Number | Name | Date |
|---|---|---|
| 151,335 | Achard | May 26, 1874 |
| 687,428 | Heinze | Nov. 26, 1901 |
| 922,802 | McBerty | May 25, 1909 |
| 944,497 | Pearson et al. | Dec. 28, 1909 |
| 1,038,131 | Hemming | Sept. 10, 1912 |
| 1,249,174 | Murry | Dec. 4, 1917 |
| 1,288,129 | Murry | Dec. 17, 1918 |
| 1,419,174 | Sherman et al. | June 13, 1922 |
| 1,424,027 | Murphy | July 25, 1922 |
| 1,441,136 | Waclaw | Jan. 2, 1934 |
| 1,591,494 | Lanchester | July 6, 1926 |
| 1,839,343 | Sachse | Jan. 5, 1932 |
| 1,892,617 | Honey | Dec. 27, 1932 |
| 1,998,136 | Jaenichen et al. | Apr. 16, 1935 |
| 2,055,766 | Hunt | Sept. 29, 1936 |
| 2,113,069 | Ross | Apr. 5, 1938 |
| 2,119,061 | Stein et al. | May 31, 1938 |
| 2,129,756 | Elder | Sept. 13, 1938 |
| 2,178,641 | Neumann | Nov. 7, 1939 |
| 2,267,681 | Fairchild | Dec. 23, 1941 |
| 2,269,389 | Watts et al. | Jan. 6, 1942 |

FOREIGN PATENTS

| Number | Country | Date |
|---|---|---|
| 21,055 | Switzerland | Dec. 31, 1900 |
| 37,685 | Norway | June 30, 1924 |